US012792301B1

(12) United States Patent
Shatsky et al.

(10) Patent No.: US 12,792,301 B1
(45) Date of Patent: Nov. 10, 2026

(54) PHASE-SHIFTED MERGING OF METADATA UPDATES FOR STORAGE SYSTEMS IMPLEMENTING A LOG-STRUCTURED MERGE ARCHITECTURE

(71) Applicant: Dell Products L.P., Round Rock, TX (US)

(72) Inventors: Yosef Shatsky, Karnei Shomron (IL); Dror Zalstein, Givatayim (IL); Oran Baruch, Tel Aviv-Jaffa (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/313,052

(22) Filed: Aug. 28, 2025

(51) Int. Cl.
*G06F 16/23* (2019.01)
*G06F 7/14* (2006.01)
*G06F 16/22* (2019.01)

(52) U.S. Cl.
CPC ............ *G06F 7/14* (2013.01); *G06F 16/2246* (2019.01); *G06F 16/2379* (2019.01)

(58) Field of Classification Search
CPC ..... G06F 7/14; G06F 16/2246; G06F 16/2379
See application file for complete search history.

(56) References Cited

U.S. PATENT DOCUMENTS 7,765,378 B1 * 7/2010 Georgiev ................ G06F 3/064 711/173
10,031,813 B2 * 7/2018 Madhavarapu ..... G06F 11/1458
10,489,301 B1 * 11/2019 Visvanathan ....... G06F 12/0868
11,163,446 B1 * 11/2021 Wils .................... G06F 16/2358
11,409,454 B1 * 8/2022 Shveidel ............... G06F 3/0635
11,775,543 B1 * 10/2023 Gellner ................... G06F 16/23 707/722
2017/0212891 A1 * 7/2017 Pundir ...................... G06F 9/50
2020/0073765 A1 * 3/2020 Tanwer ............... G06F 11/1456
2024/0004877 A1 * 1/2024 Shatsky ............. G06F 16/2246

OTHER PUBLICATIONS

Z. Chen et al., "A ReRAM-Based Processing-in-Memory Framework for LSM-Based Key-Value Store," in IEEE Transactions on Computer-Aided Design of Integrated Circuits and Systems, vol. 45, No. 2, pp. 1061-1074, 2025. (Year: 2025).*

(Continued)

*Primary Examiner* — Kris E Mackes
(74) *Attorney, Agent, or Firm* — Ryan, Mason & Lewis, LLP

(57) ABSTRACT

Techniques are provided for phase-shifted merging of metadata updates for log-structured merge (LSM) data structures. One method comprises maintaining an LSM data structure comprising metadata entries associated with input-output operations of the storage system, the LSM data structure comprising two or more levels, at least one of the two or more levels comprising a plurality of segments; determining, responsive to detecting a merge condition, a merge set comprising two or more of the segments in a first level of the LSM data structure; and merging metadata updates from the determined merge set to a segment of a second level of the LSM data structure, wherein a number of segments included in a merge set of the LSM data structure is changed to provide a shift in time of the merging relative to a time of a merging of a merge set of at least one additional LSM data structure.

20 Claims, 7 Drawing Sheets

(56) References Cited

OTHER PUBLICATIONS

M. Cai, X. Jiang, J. Shen and B. Ye, "SplitDB: Closing the Performance Gap for LSM-Tree-Based Key-Value Stores," in IEEE Transactions on Computers, vol. 73, No. 1, pp. 206-220, 2023. (Year: 2023).*

L. Chen et al., "Workload-Aware Log-Structured Merge Key-Value Store for NVM-SSD Hybrid Storage," 2023 IEEE 39th International Conference on Data Engineering (ICDE), Anaheim, CA, USA, 2023, pp. 2207-2219. (Year: 2023).*

Luo, Chen et al.; "LSM-Based Storage Techniques: a Survey"; arXiv:1812.07527v3 [cs.DB] Jul. 19, 2019.

U.S. Appl. No. 19/091,029 entitled: "Segment Partitioning for Storage Systems Implementing a Log-Structured Merge Arthitecture"; filed Mar. 26, 2025.

* cited by examiner

PHASE SHIFT-BASED RESOURCE UTILIZATION
CONTROL PROCESS 500 FOR LSM MERGE OPERATIONS

1. COORDINATOR ASSIGNS AN LSM INDEX TO EACH LSM

2. LSM COUNT = NUMBER OF LSMs

3. SEGMENTS IN MERGE SET = DESIGNATED NUMBER OF SEGMENTS TO INCLUDE IN THE MERGE SET WITHOUT TIME SHIFTING

4. PHASE ASSIGNED FOR EACH LSM =
ROUND_DOWN (LSM INDEX / LSM COUNT* SEGMENTS IN MERGE SET)

5. IN RESPONSE TO DETECTING A MERGE TIME SHIFT EVENT: DETERMINE A PHASE SHIFT (NEW PHASE) FOR MERGE OPERATIONS FOR LSMs BASED ON THE NUMBER OF SEGMENTS TO INCLUDE IN THE MERGE SET

6. EACH LSM SHIFTS, AS FOLLOWS:
LSM SHIFT = NEW PHASE – OLD PHASE

FIG. 5

PHASE-SHIFTED MERGING OF METADATA UPDATES FOR STORAGE SYSTEMS IMPLEMENTING A LOG-STRUCTURED MERGE ARCHITECTURE

BACKGROUND

Various types of storage systems, including storage systems implementing software-defined storage (SDS) solutions, may be configured to run workloads from multiple different end-users or applications. Different end-users or applications may have different performance and feature requirements for their associated workloads. In some workloads, performance may be most important. In other workloads, capacity utilization or other feature requirements may be most important. There is thus a need for techniques which enable a storage system to offer flexibility in storage offerings for workloads with different performance and feature requirements.

SUMMARY

Illustrative embodiments of the disclosure provide techniques for phase-shifted merging of metadata updates for storage systems implementing a log-structured merge (LSM) architecture. One method includes maintaining, in memory of a storage system, at least a portion of an LSM data structure comprising metadata entries associated with input-output operations of the storage system, the LSM data structure comprising two or more levels, at least one of the two or more levels comprising a plurality of segments; determining, responsive to detecting a merge condition, a merge set comprising two or more of the plurality of segments in a first level of the LSM data structure; and merging metadata updates from the determined merge set to a segment of a second level of the LSM data structure, wherein a number of segments included in at least one merge set of the LSM data structure is changed to provide a shift in time of the merging relative to a time of a merging of at least one merge set of at least one additional LSM data structure.

Illustrative embodiments can provide significant advantages relative to conventional techniques. For example, technical problems related to such conventional techniques are mitigated in one or more embodiments by desynchronizing a merging of metadata updates associated with multiple LSM data structures by dynamically adjusting a size of merge sets.

These and other illustrative embodiments described herein include, without limitation, methods, apparatus, systems, and computer program products comprising processor-readable storage media.

BRIEF DESCRIPTION OF THE DRAWINGS

FIG. 5 illustrates a phase shift-based resource utilization control process for LSM merge operations in an illustrative embodiment.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for phase-shifted merging of metadata updates for storage systems implementing an LSM architecture.

Figure 1A:
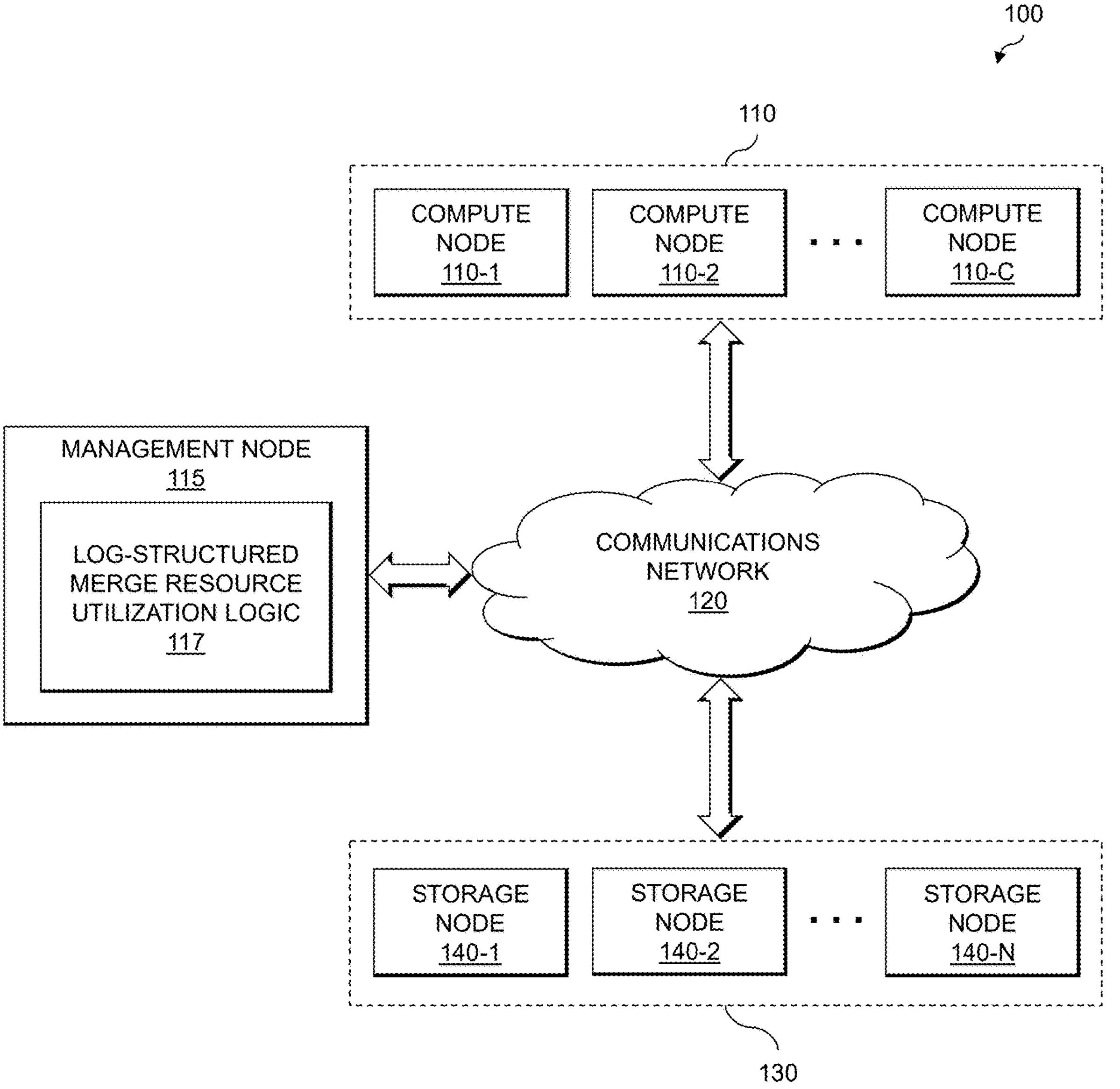
FIGS. 1A and 1B schematically illustrate an information processing system comprising a storage system configured for phase-shifted merging of metadata updates for storage systems implementing an LSM architecture in an illustrative embodiment.
Figure 1B:
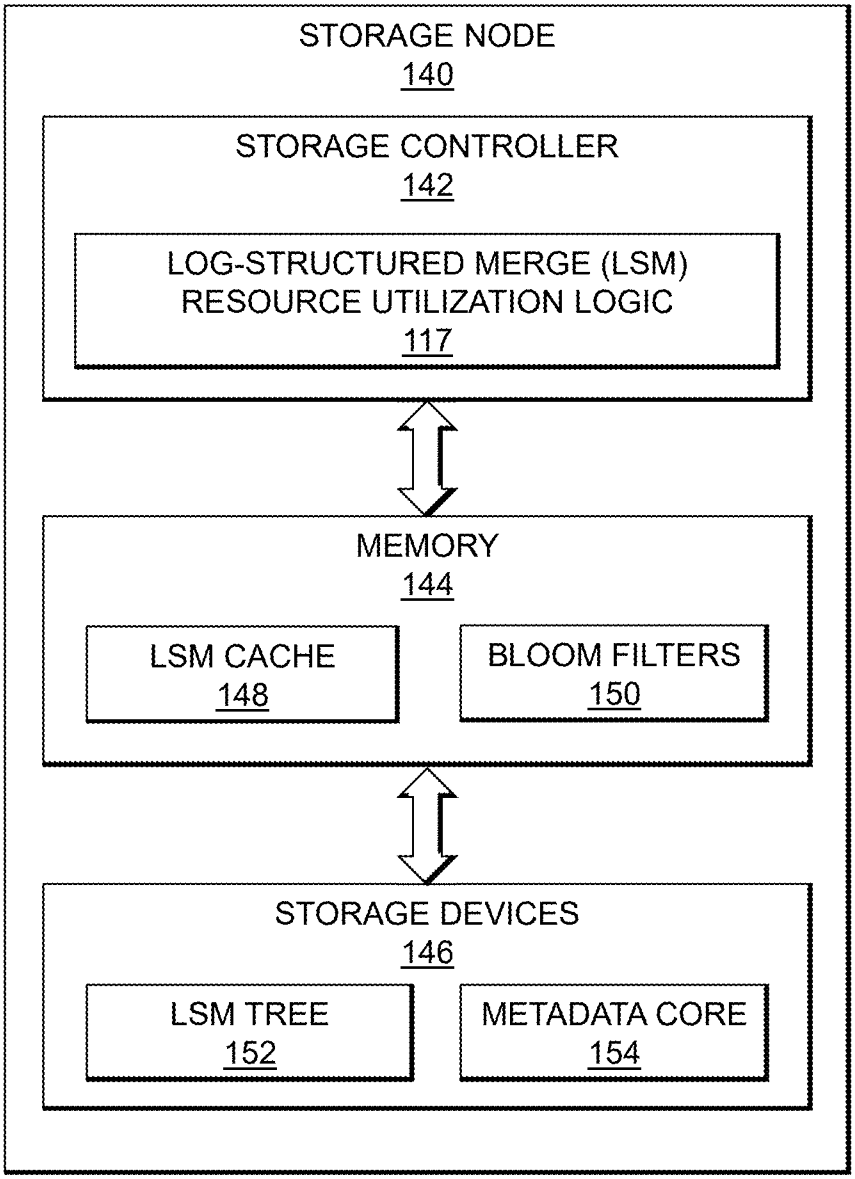

FIGS. 1A and 1B schematically illustrate an information processing system which is configured for phase-shifted merging of metadata updates for LSM (LSM) data structures in a storage system implementing an LSM architecture according to an exemplary embodiment of the disclosure. More specifically, FIG. 1A schematically illustrates an information processing system 100 which comprises a plurality of compute nodes 110-1, 110-2, . . . , 110-C (collectively referred to as compute nodes 110, or each singularly referred to as a compute node 110), one or more management nodes 115 (which support a management layer of the system 100), a communications network 120, and a data storage system 130 (which supports a data storage layer of the system 100). The data storage system 130 comprises a plurality of storage nodes 140-1, 140-2, . . . , 140-N (collectively referred to as storage nodes 140, or each singularly referred to as a storage node 140). In the context of the exemplary embodiments described herein, the management nodes 115 and the data storage system 130 implement LSM resource utilization logic 117 supporting optimization or improvement of IO processing in the data storage system 130. FIG. 1B schematically illustrates an exemplary framework of at least one or more of the storage nodes 140.

In particular, as shown in FIG. 1B, the storage node 140 comprises a storage controller 142, a memory 144 and a plurality of storage devices 146. In general, the storage controller 142 implements data storage and management methods that are configured to divide the storage capacity of the storage devices 146 into storage pools and logical volumes. Storage controller 142 is further configured to implement LSM resource utilization logic 117 in accordance with the disclosed embodiments, as will be described in further detail below. It is to be noted that the storage controller 142 may include additional modules and other components typically found in conventional implementations of storage controllers and storage systems, although such additional modules and other components are omitted for clarity and simplicity of illustration.

The storage node 140 is assumed to implement an LSM storage architecture, in which the memory 144 includes an LSM cache 148 and a set of one or more bloom filters (BFs) 150. The LSM cache 148 provides an in-memory data structure with a limited size providing a buffer or cache for metadata for IO write operations. The LSM cache 148 typically has a limited size, and thus is not able to store the full LSM data structure. When the LSM cache 148 is full, data may be flushed to the storage devices 146 (e.g., using any desired cache replacement algorithm). The BFs 150 are space-efficient probabilistic data structures, which may be used to check if a given storage object is in the LSM cache 148. If a query to the BFs 150 returns a positive response, then the given storage object might be present in the LSM cache 148 (with some configurable false positive (FP) ratio). Thus, a search in the LSM cache 148 may be conducted for metadata associated with the given storage object. If the query to the BFs 150 returns a negative response, then the given storage object is not in the LSM cache 148, and LSM tree 152 in the storage devices 146 may be searched directly for the given storage object (e.g., skipping a search of the LSM cache 148, providing efficiency for metadata reads). The LSM tree 152 is an example of what is more generally referred to herein as an "LSM data structure." More generally, an LSM data structure may be any data structure or combination of data structures suitable for storing LSM-related information.

Data may also be periodically flushed from the LSM tree 152 to a metadata core 154 maintained in the storage devices 146. In some embodiments, the LSM cache 148 stores the entire LSM data structure, such that LSM tree 152 may be omitted (e.g., the entire LSM tree 152, rather than just the LSM cache 148, may be maintained in memory 144). The LSM resource utilization logic 117 is configured to coordinate a timing (e.g., a phase) of the merge operations associated with multiple LSM data structures (e.g., LSM trees 152). For example, the LSM resource utilization logic 117 may be configured to determine a time (e.g., a phase) for each LSM data structure to perform a merge operation. The LSM resource utilization logic 117 may adjust a number of segments included in at least one merge set of a given LSM data structure to provide a shift in time of a merging of the at least one merge set, relative to a time of merging at least one additional merge set of at least one additional LSM data structure. The adjustment may be performed, for example, when the size of the LSM data structure changes. A phase shift may be introduced, for example, by performing a merge operation prematurely one or more times (e.g., there will be fewer segments in the merge set than a designated number of segments per merge set).

The LSM resource utilization logic 117 may also be configured to implement "merge-to-core" processing (e.g., flushing of a "merge set" including multiple segments of a bottom level of LSM tree 152 to the metadata core 154), enabling efficient resource reclamation (e.g., of segments of the LSM tree 152, and ones of the BFs 150 associated with such segment) as the merge of each segment is completed, as discussed further below in conjunction with FIG. 3.

In the embodiment of FIGS. 1A and 1B, the LSM resource utilization logic 117 may be implemented at least in part within the one or more management nodes 115 as well as in one or more of the storage nodes 140 of the data storage system 130. This may include implementing different portions of the LSM resource utilization logic 117 functionality described herein within the management nodes 115 and the storage nodes 140. In other embodiments, however, the LSM resource utilization logic 117 may be implemented entirely within the management nodes 115 or entirely within the storage nodes 140. In still other embodiments, at least a portion of the functionality of the LSM resource utilization logic 117 is implemented in one or more of the compute nodes 110.

The compute nodes 110 illustratively comprise physical compute nodes and/or virtual compute nodes which process data and execute workloads. For example, the compute nodes 110 can include one or more server nodes (e.g., bare metal server nodes) and/or one or more virtual machines. In some embodiments, the compute nodes 110 comprise a cluster of physical server nodes or other types of computers of an enterprise computer system, cloud-based computing system or other arrangement of multiple compute nodes associated with respective users. In some embodiments, the compute nodes 110 include a cluster of virtual machines that execute on one or more physical server nodes.

The compute nodes 110 are configured to process data and execute tasks/workloads and perform computational work, either individually, or in a distributed manner, to thereby provide compute services such as execution of one or more applications on behalf of each of one or more users associated with respective ones of the compute nodes. Such applications illustratively issue IO (input-output) requests that are processed by a corresponding one of the storage nodes 140. The term "input-output" as used herein refers to at least one of input and output. For example, IO requests may comprise write requests and/or read requests directed to stored data of a given one of the storage nodes 140 of the data storage system 130.

The compute nodes 110 are configured to write data to and read data from the storage nodes 140 in accordance with applications executing on those compute nodes for system users. The compute nodes 110 communicate with the storage nodes 140 over the communications network 120. While the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., Ethernet storage network), or various portions or combinations of these and other types of networks.

In this regard, the term "network" as used herein is therefore intended to be broadly construed so as to encompass a wide variety of different network arrangements, including combinations of multiple networks possibly of different types, which enable communication using, e.g., Transfer Control/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement IO channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, a direct-attached storage (DAS) system, etc., as well as other types of data storage systems comprising software-defined storage, clustered or distributed virtual and/or physical infrastructure. The term "data storage system" as used herein should be broadly constructed and not viewed as being limited to storage systems of any particular type or types. In some embodiments, the storage nodes 140 comprise storage server nodes having one or more processing devices each having a processor and a memory, possibly implementing virtual machines and/or containers, although numerous other configurations are possible. In some embodiments, one or more of the storage nodes 140 can additionally implement functionality of a compute node, and vice-versa. The term "storage node" as used herein is therefore intended to be broadly construed, and a storage system in some embodiments can be implemented using a combination of storage nodes and compute nodes.

In some embodiments, as schematically illustrated in FIG. 1B, the storage node 140 is a physical server node or storage appliance, wherein the storage devices 146 comprise DAS resources (internal and/or external storage resources) such as hard-disk drives (HDDs), solid-state drives (SSDs), Flash memory cards, or other types of non-volatile memory (NVM) devices such as non-volatile random-access memory (NVRAM), phase-change RAM (PC-RAM) and magnetic RAM (MRAM). These and various combinations of multiple different types of storage devices 146 may be implemented in the storage node 140. In this regard, the term "storage device" as used herein is intended to be broadly construed, so as to encompass, for example, SSDs, HDDs, flash drives, hybrid drives or other types of storage media. The storage devices 146 are connected to the storage node 140 through any suitable host interface, e.g., a host bus adapter, using suitable protocols such as ATA, SATA, eSATA, NVMe, NVMeOF, SCSI, SAS, etc. In other embodiments, the storage node 140 can be network connected to one or more NAS nodes over a local area network.

The storage controller 142 is configured to manage the storage devices 146 and control IO access to the storage devices 146 and/or other storage resources (e.g., DAS or NAS resources) that are directly attached or network-connected to the storage node 140. In some embodiments, the storage controller 142 is a component (e.g., storage data server) of a software-defined storage (SDS) system which supports the virtualization of the storage devices 146 by separating the control and management software from the hardware architecture. More specifically, in a software-defined storage environment, the storage controller 142 comprises an SDS storage data server that is configured to abstract storage access services from the underlying storage hardware to thereby control and manage IO requests issued by the compute nodes 110, as well as to support networking and connectivity. In this instance, the storage controller 142 comprises a software layer that is hosted by the storage node 140 and deployed in the data path between the compute nodes 110 and the storage devices 146 of the storage node 140, and is configured to respond to data IO requests from the compute nodes 110 by accessing the storage devices 146 to store/retrieve data to/from the storage devices 146 based on the IO requests.

In a software-defined storage environment, the storage controller 142 is configured to provision, orchestrate and manage the local storage resources (e.g., the storage devices 146) of the storage node 140. For example, the storage controller 142 implements methods that are configured to create and manage storage pools (e.g., virtual pools of block storage) by aggregating capacity from the storage devices 146. The storage controller 142 can divide a storage pool into one or more volumes and expose the volumes to the compute nodes 110 as virtual block devices. For example, a virtual block device can correspond to a volume of a storage pool. Each virtual block device comprises any number of actual physical storage devices, wherein each block device is preferably homogeneous in terms of the type of storage devices that make up the block device (e.g., a block device only includes either HDD devices or SSD devices, etc.).

In the software-defined storage environment, each of the storage nodes 140 in FIG. 1A can run an instance of the storage controller 142 to convert the respective local storage resources (e.g., DAS storage devices and/or NAS storage devices) of the storage nodes 140 into local block storage. Each instance of the storage controller 142 contributes some or all of its local block storage (HDDs, SSDs, PCIe, NVMe and flash cards) to an aggregated pool of storage of a storage server node cluster (e.g., cluster of storage nodes 140) to implement a server-based storage area network (SAN) (e.g., virtual SAN). In this configuration, each storage node 140 is part of a loosely coupled server cluster which enables "scale-out" of the software-defined storage environment, wherein each instance of the storage controller 142 that runs on a respective one of the storage nodes 140 contributes its local storage space to an aggregated virtual pool of block storage with varying performance tiers (e.g., HDD, SSD, etc.) within a virtual SAN.

In some embodiments, in addition to the storage controllers 142 operating as SDS storage data servers to create and expose volumes of a storage layer, the software-defined storage environment comprises other components such as (i) SDS data clients that consume the storage layer and (ii) SDS metadata managers that coordinate the storage layer, which are not specifically shown in FIG. 1A. More specifically, on the client-side (e.g., compute nodes 110), an SDS data client (SDC) is a lightweight block device driver that is deployed on each server node that consumes the shared block storage volumes exposed by the storage controllers 142. In particular, the SDCs run on the same servers as the compute nodes 110 which require access to the block devices that are exposed and managed by the storage controllers 142 of the storage nodes 140. The SDC exposes block devices representing the virtual storage volumes that are currently mapped to that host. In particular, the SDC serves as a block driver for a client (server), wherein the SDC intercepts IO requests, and utilizes the intercepted IO request to access the block storage that is managed by the storage controllers 142. The SDC provides the operating system or hypervisor (which runs the SDC) access to the logical block devices (e.g., volumes).

The SDCs have knowledge of which SDS control systems (e.g., storage controller 142) hold its block data, so multipathing can be accomplished natively through the SDCs. In particular, each SDC knows how to direct an IO request to the relevant destination SDS storage data server (e.g., storage controller 142). In this regard, there is no central point of routing, and each SDC performs its own routing independent from any other SDC. This implementation prevents unnecessary network traffic and redundant SDS resource usage. Each SDC maintains peer-to-peer connections to every storage controller 142 that manages the storage pool. A given SDC can communicate over multiple pathways to all of the storage nodes 140 which store data that is associated with a given IO request. This multi-point peer-to-peer fashion allows the SDS to read and write data to and from all points simultaneously, eliminating bottlenecks and quickly routing around failed paths.

The management nodes 115 in FIG. 1A implement a management layer that is configured to manage and configure the storage environment of the system 100. In some embodiments, the management nodes 115 comprise the SDS metadata manager components, wherein the management nodes 115 comprise a tightly-coupled cluster of nodes that are configured to supervise the operations of the storage cluster and manage storage cluster configurations. The SDS metadata managers operate outside of the data path and provide the relevant information to the SDS clients and storage servers to allow such components to control data path operations. The SDS metadata managers are configured to manage the mapping of SDC data clients to the SDS data storage servers. The SDS metadata managers manage various types of metadata that are required for system operation of the SDS environment such as configuration changes, managing the SDS data clients and data servers, device mapping, values, snapshots, system capacity including device allocations and/or release of capacity, RAID protection, recovery from errors and failures, and system rebuild tasks including rebalancing.

While FIG. 1A shows an exemplary embodiment of a two-layer deployment in which the compute nodes 110 are separate from the storage nodes 140 and connected by the communications network 120, in other embodiments, a converged infrastructure (e.g., hyperconverged infrastructure) can be implemented to consolidate the compute nodes 110, storage nodes 140, and communications network 120 together in an engineered system. For example, in a hyperconverged deployment, a single-layer deployment is implemented in which the storage data clients and storage data servers run on the same nodes (e.g., each node deploys a storage data client and storage data servers) such that each node is a data storage consumer and a data storage supplier. In other embodiments, the system of FIG. 1A can be implemented with a combination of a single-layer and two-layer deployment.

Regardless of the specific implementation of the storage environment, as noted above, various modules of the storage controller 142 of FIG. 1B collectively provide data storage and management methods that are configured to perform various functions as follows. In particular, a storage virtualization and management services module may implement any suitable logical volume management (LVM) system which is configured to create and manage local storage volumes by aggregating the storage devices 146 into one or more virtual storage pools that are thin-provisioned for maximum capacity, and logically dividing each storage pool into one or more storage volumes that are exposed as block devices (e.g., raw logical unit numbers (LUNs)) to the compute nodes 110 to store data. In some embodiments, the storage devices 146 are configured as block storage devices where raw volumes of storage are created and each block can be controlled as, e.g., an individual disk drive by the storage controller 142. Each block can be individually formatted with a same or different file system as required for the given data storage system application.

In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module implements methods to support various data storage management services such as data protection, data migration, data deduplication, replication, thin provisioning, snapshots, data backups, etc.

Storage systems, such as the data storage system 130 of system 100, may be required to provide both high performance and a rich set of advanced data service features for end-users thereof (e.g., users operating compute nodes 110, applications running on compute nodes 110). Performance may refer to latency, or other metrics such as IO operations per second (IOPS), bandwidth, etc. Advanced data service features may refer to data service features of storage systems including, but not limited to, services for data resiliency, thin provisioning, data reduction, space efficient snapshots, etc. Fulfilling both performance and advanced data service feature requirements can represent a significant design challenge for storage systems. This may be due to different advanced data service features consuming significant resources and processing time. Such challenges may be even greater in software-defined storage systems in which custom hardware is not available for boosting performance.

Device tiering may be used in some storage systems, such as in storage systems that contain some relatively "fast" and expensive storage devices and some relatively "slow" and less expensive storage devices. In device tiering, the "fast" devices may be used when performance is the primary requirement, where the "slow" and less expensive devices may be used when capacity is the primary requirement. Such device tiering may also use cloud storage as the "slow" device tier. Some storage systems may also or alternatively separate devices offering the same performance level to gain performance isolation between different sets of storage volumes. For example, the storage systems may separate the "fast" devices into different groups to gain performance isolation between storage volumes on such different groups of the "fast" devices.

Illustrative embodiments provide functionality for optimizing or improving performance of storage systems which utilize LSM-based storage architectures (e.g., for LSM-based metadata updates), through phase-shifted merging of metadata updates for LSM data structures.

An exemplary process for phase-shifted merging of metadata updates for LSM data structures will now be described in more detail with reference to the flow diagram of FIG. 2. It is to be understood that this particular process is only an example, and that additional or alternative processes for phase-shifted merging of metadata updates for LSM data structures may be used in other embodiments.

In this embodiment, the process includes steps 202 through 206. These steps are assumed to be performed using the LSM resource utilization logic 117, which as noted above may be implemented in the management nodes 115 of system 100, in storage nodes 140 of the data storage system 130 of system 100, in compute nodes 110 of system 100, combinations thereof, etc. The process begins with step 202, maintaining, in memory of a storage system, at least a portion of an LSM data structure comprising metadata entries associated with IO operations of the storage system. The LSM data structure comprises two or more levels, and at least one of the two or more levels comprises a plurality of segments.

The plurality of segments may comprise time-ordered metadata entries associated with the IO operations of the storage system.

In step 204, responsive to detecting a merge condition, a merge set is determined, the merge set comprising two or more of the plurality of segments in a first level of the LSM data structure. The merge set may comprise less than all of the plurality of segments in the first level of the LSM data structure.

Metadata updates from the determined merge set are merged in step 206 to a segment of a second level of the LSM data structure, wherein a number of segments included in at least one merge set of the LSM data structure is changed to provide a shift in time of the merging relative to a time of the merging of at least one merge set of at least one additional LSM data structure.

It should be noted that the term "data structure" as used herein is intended to be broadly construed. A data structure, such as any single one of or combination of the data structures referred to above, may provide a portion of a larger data structure, or any one of or combination of the data structures may be combinations of multiple smaller data structures. Therefore, the data structures referred to above may be different parts of a same overall data structure, or one or more of the data structures could be made up of multiple smaller data structures. The data structures may include tables, vectors, embeddings, or various other data structures. In some embodiments, the data structures are specifically formatted or generated such that they are suitable for use as at least one of an input to and an output from an ML model. It should further be appreciated that "generating" a data structure may encompass, for example, populating an existing or previously-created data structure with one or more data items and that "accessing" a data structure may encompass, for example, obtaining a portion (e.g., one or more data items) of one or more data structures by means of a query, select or filter operation, for example.

In some embodiments, the number of segments included in the merge set of the LSM data structure may be changed in response to an occurrence of one or more of a change in a maximum size of the LSM data structure; a total number of the LSM data structures; and a flushing of one or more of the LSM data structures. The LSM data structure may be assigned an initial phase and the LSM data structure may be assigned a new phase associated with the shift in time, and wherein a number of segments included in the merge set, at the time of the shift, is based at least in part on a difference between the new phase and the initial phase.

Figure 2:
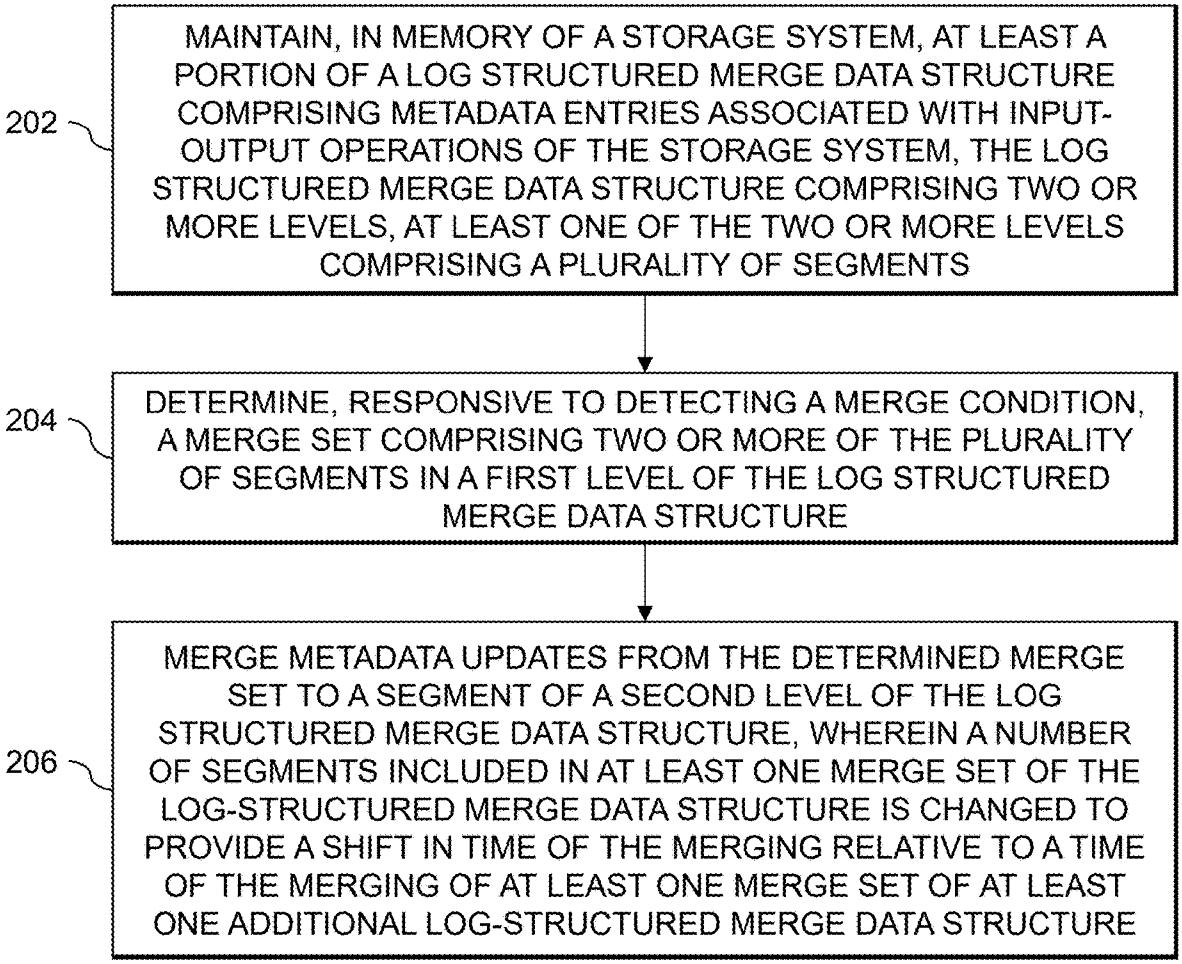
FIG. 2 is a flow diagram of an exemplary process for phase-shifted merging of metadata updates for storage systems implementing an LSM architecture in an illustrative embodiment.

In an embodiment, the process of FIG. 2 may further comprise (i) creating a designated number of phases, for a plurality of the LSM data structures to merge respective metadata updates, by changing a number of segments included in at least one merge set the designated number of times; (ii) creating a shift of the merging in a first time direction by a given number of the segments by shifting in a second time direction by an amount equal to a default number of segments included in a merge set less than the given number of the segments; and/or (iii) monitoring a synchronization of the merging of metadata updates by a plurality of the LSM data structures based at least in part on a fill rate of a current merge set in a lowest level of the plurality of the LSM data structures.

In one or more embodiments, the plurality of segments comprises time-ordered metadata entries associated with the input-output operations of the storage system. The merge set may comprise less than all of the plurality of segments in the first level of the LSM data structure.

In at least one embodiment, the process of FIG. 2 may further comprise (i) removing at least one of the two or more segments in the merge set from the LSM data structure responsive to completing the merging; (ii) maintaining, in the memory of the storage system, a plurality of bloom filters for respective ones of the plurality of segments; and/or (iii) removing a given one of the plurality of bloom filters associated with a given segment responsive to completing the merging of the given segment to the second level of the LSM data structure.

The particular processing operations and other system functionality described in conjunction with the flow diagram of FIG. 2 are presented by way of illustrative example only and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, multiple instances of the process can be performed in parallel with one another, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Storage clusters and other storage systems may apply LSM techniques to optimize metadata (MD) update flows. In such systems, MD updates (e.g., MD deltas) are collected or aggregated in time-ordered contiguous LSM chunks or segments, that are periodically merged or compacted to larger chunks or segments in a next or bottom level of the LSM data structure (e.g., an LSM tree may include 2-5 levels). Merges from the bottom level of the LSM are performed to a core MD store, as discussed further below in conjunction with FIG. 3. This allows for reducing MD "write amplification" by avoiding or minimizing random small updates of core MD pages. Many deltas are aggregated inside the LSM data structure and are applied to the MD core together in a single write operation in an aggregated manner.

Figure 3:
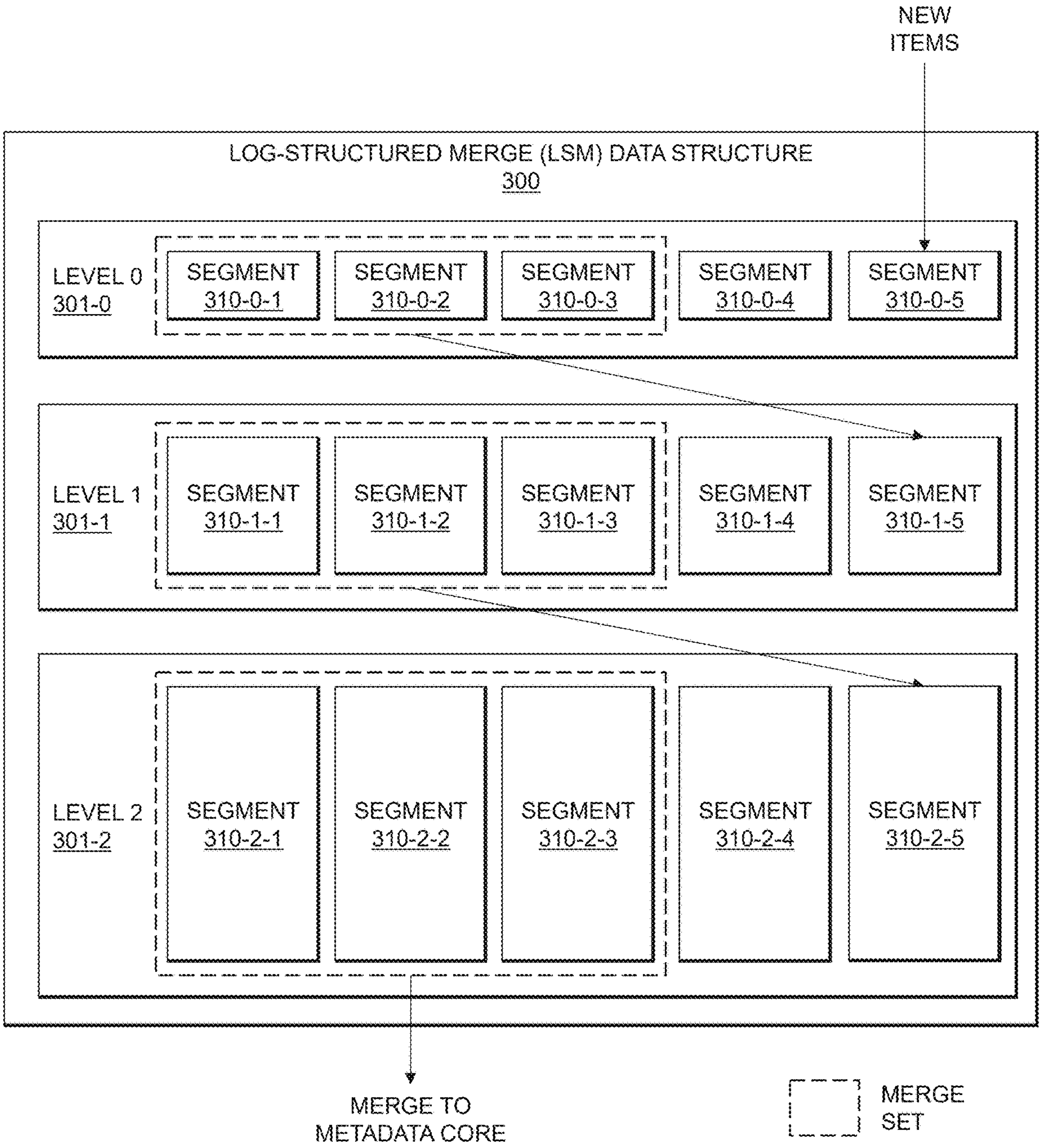
FIG. 3 illustrates an LSM data structure in an illustrative embodiment.

FIG. 3 shows an LSM data structure 300 including three levels—level 301-0, level 301-1 and level 301-2 (collectively, levels 301). Level 301-0 includes segments 310-0-1, 310-0-2, 310-0-3, 310-0-4 and 310-0-5 (collectively, segments 310-0). Level 301-1 includes segments 310-1-1, 310-1-2, 310-1-3, 310-1-4 and 310-1-5 (collectively, segments 310-1). Level 301-2 includes segments 310-2-1, 310-2-2, 310-2-3, 310-2-4 and 310-2-5 (collectively, segments 310-2). Typically, the number of segments 310 per level 301 is equal. Each of the levels 301 includes a set of segments. New items are written to segment 310-0-5 in level 301-0.

When enough items are accumulated in level 301-0, a merge set including segments 310-0-1, 310-0-2 and 310-0-3 are merged to segment 310-1-5 in level 301-1. When enough items are accumulated in level 301-1, a merge set including segments 310-1-1, 310-1-2 and 310-1-3 are merged to segment 310-2-5 in level 301-2. When enough items are accumulated in level 301-2, a merge set including segments 310-2-1, 310-2-2 and 310-2-3 are merged to an MD core structure.

Thus, the LSM data structure 300 may be paired with another, larger structure, referred to as the MD core, that receives it updates from the LSM data structure 300. This MD core structure may be large and partially swapped out of RAM, requiring disk IO to update it. The LSM data structure 300 serves as a "buffer" that aggregates changes and thereby reduces the number of times the primary structure will be performing IO (write amortization).

As illustrated in FIG. 3, the LSM data structure 300 is composed of multiple levels 301, where each of the levels 301 contains multiple segments. Each segment contains ordered items (e.g., MD deltas). Multiple segments from a level i are merged into a single segment that is then placed in level i+1. The number of segments to merge is implementation specific. In the FIG. 3 example, segments are merged in sets of three. The group of segments which is merged together is called a merge set. The "height" of each of the segments in FIG. 3 indicates the relative size of the segments (e.g., segments 310-0 are smaller than segments 310-1, and segments 310-1 are smaller than segments 310-2). To allow for fast lookup of items in the LSM data structure 300, each segment may be associated with a BF. When segments are merged, a new BF is created for the new segment. It should be appreciated that once a merge set is merged (e.g., from one of the levels 301 to another, or from level 301-2 to the MD core), the source segments are removed from the LSM data structure 300 and their associated BFs are also removed.

Therefore, memory is reclaimed gradually as the merge-to-core processing flow progresses, providing allocatable space for new LSM segments that are being built concurrently. In an ideal case, the merge-to-core process flow should follow (e.g., be the same as) the new ingest rate to the bottom level of the LSM data structure, which provides completely smooth merge-to-core processing, where resources required for such processing correspond to the resources required for just one merge set (e.g., 8 segments in some examples) with minimal or zero overhead.

The LSM data structure 300 accumulates changes which are fed to a larger "core" structure (e.g., MD core) that is not write optimized (e.g., a B-tree) and which contains the vast majority of the items. The LSM data structure 300 behaves as a type of journal to the larger MD core structure, accumulating changes to be applied to the MD core in bulk. When using an LSM data structure 300 and MD core structure, the bottom level 301-2 of the LSM data structure 300, in the example of FIG. 3, merges its items into the MD core structure.

One advantage of pairing of the LSM data structure 300 with the MD core structure is write amortization (e.g., a page in the MD core is written to serve many items in the LSM instead of only one). This considerably reduces the write overhead required for MD updates. The larger the LSM data structure 300 is (e.g., the more deltas or items which are collected therein), the better the write amortization and aggregation to the MD core will be. From the other side, any read operation that requires an MD page should potentially search in all chunks or segments of the LSM data structure, since any of them may potentially contain the relevant MD, and not just in the core MD pages. To reduce the number of LSM read operations, in-memory BFs may be maintained for all LSM segments. Each MD update (e.g., key) that is added to a segment is also added to the corresponding BF. Thus, before reading or searching for a key in an LSM segment, the key is looked-up in the corresponding volatile BF. If the lookup succeeds, the corresponding segment is read.

To provide good MD update write amortization, the size of the LSM data structure 300 (specifically, a size of the bottom level 301-2 of the LSM data structure 300 where merges to the MD core are performed from) should be rather large (e.g., 0.5-5% of the entire size of the MD core). Merging of the MD from the LSM data structure 300 to the MD core is a processor-intensive (e.g., central processing unit (CPU)-intensive) job, and can take a long time (e.g., tens of minutes in a loaded storage system). For a more detailed discussion of a merge-to-core processing flow, see, for example, U.S. patent application Ser. No. 19/091,029, filed Mar. 26, 2025, entitled "Segment Partitioning for Storage Systems Implementing an LSM Architecture," incorporated by reference herein in its entirety.

Figure 4:
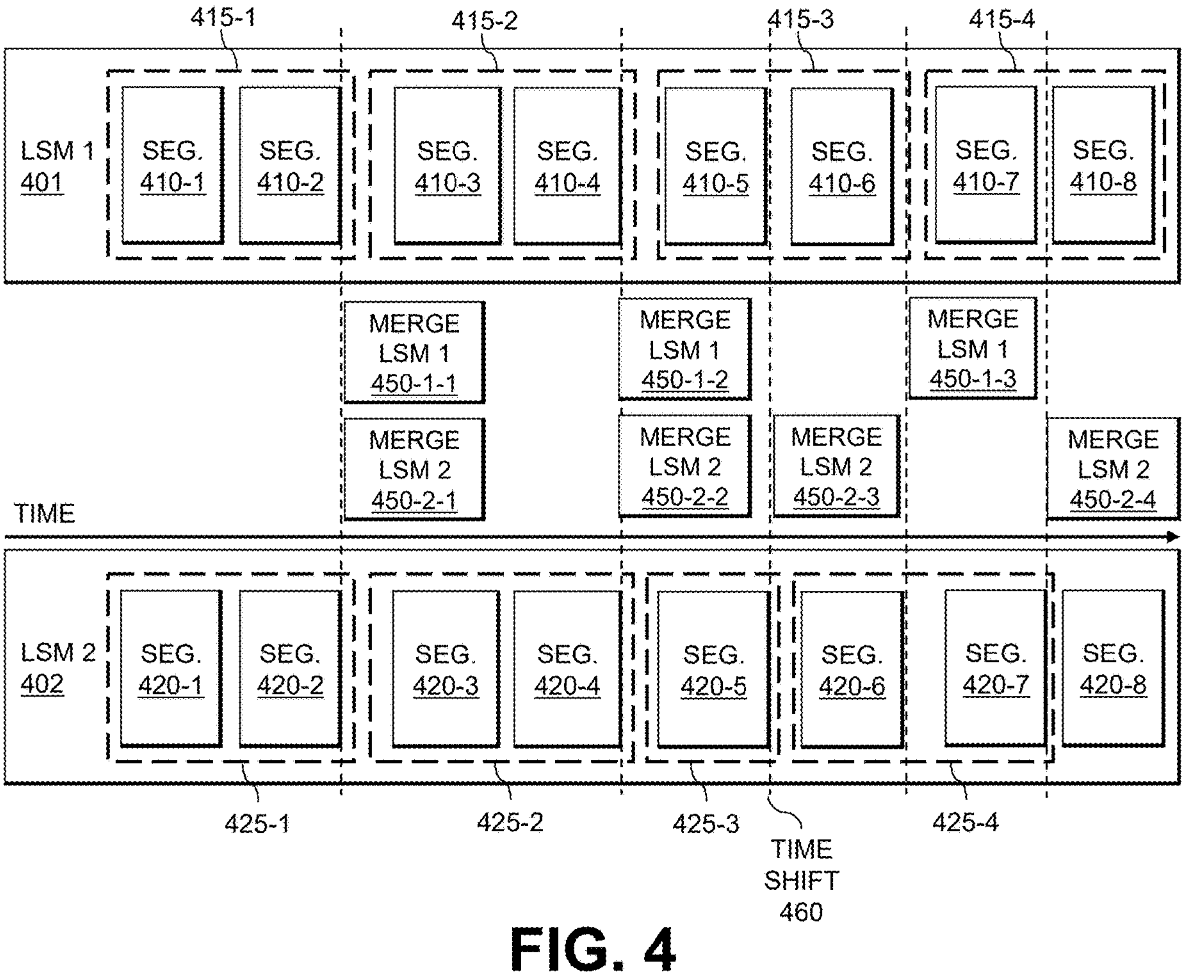
FIG. 4 illustrates a phase shifting of merge operations for multiple LSM data structures in an illustrative embodiment.

FIG. 4 illustrates a phase shifting of merge operations for multiple LSM data structures in an illustrative embodiment. One or more aspects of the disclosure recognize that the process of merging merge sets from one level 301-*i* of the LSM data structure 300 to the next level 301-*i*+1 of the LSM data structure 300 requires resources, such as CPU, RAM, network or disk access resources. The merge processes for multiple LSM data structures execute for a period of time (and at the same time) until completion, after which time the merge process waits for the next merge set to be ready. This demonstrates a non-uniform resource utilization over time (e.g., a non-uniform CPU load utilization).

In a system that contains a number of synchronized LSM data structures 300 (e.g., each filling up and merging at the same time), the CPU overhead, for example, associated with the merges of the multiple LSM data structures 300 will be processed at the same point in time, leading to above average (and non-uniform) CPU consumption and reduced performance. For purposes of illustration, the CPU utilization is assumed to be the resource to balance. The disclosed techniques for phase-shifted merging of metadata updates for LSM data structures, however, may be employed to improve the utilization of one or more resources, such as CPU, RAM, network and/or disk access resources, as would be apparent to a person of ordinary skill in the art.

In the example of FIG. 4, a given level of a first LSM data structure 401 comprises segments 410-1 through 410-8 and a given level of a second LSM data structure 402 comprises segments 420-1 through 420-8. The number of segments to merge is implementation specific. In the FIG. 4 example, segments are merged in sets of two.

When enough items are accumulated in the given levels of the first and second LSM data structures 401, 402, a merge set 415-1 for the first LSM data structure 401, which includes segments 410-1 and 410-2, and a merge set 425-1 for the second LSM data structure 402, which includes segments 420-1 and 420-2, are merged, using merge operations 450-1-1 and 450-2-1, respectively, to a segment in a next level of the respective first and second LSM data structures 401, 402.

As shown in FIG. 4, the merge sets of the first and second LSM data structures 401, 402 are fully populated at the same time, and the respective merge operations 450-1-1 and 450-2-1 are performed at the same time (e.g., using conventional merge techniques).

Similarly, when enough items are accumulated in the given levels of the first and second LSM data structures 401, 402, another merge set 415-2 for the first LSM data structure 401, which includes segments 410-3 and 410-4, and another merge set 425-2 for the second LSM data structure 402, which includes segments 420-3 and 420-4, are merged, using merge operations 450-1-2 and 450-2-2, respectively, to a segment in a next level of the respective first and second LSM data structures 401, 402.

In one or more embodiments, a merging of metadata updates associated with multiple LSM data structures is desynchronized by dynamically adjusting a size of one or more merge sets 415, 425. In the example of FIG. 4, a time shift 460 is introduced by reducing a size of a merge set 425-3 from two segments to one segment. Thus, the merge set 425-3 for the second LSM data structure 402 only includes segment 420-5 and the merge operation 450-2-3 for the second LSM data structure 402 is triggered sooner than the merge operation 450-1-3 for the first LSM data structure 401, as the merge set 415-3 for the first LSM data structure 401 still includes two segments 410-5 and 410-6. In this manner, the merge operation 450-1-3 for the first LSM data structure 401 is triggered later than the merge operation 450-2-4 for the second LSM data structure 402.

As shown in FIG. 4, the merge set for the second LSM data structure 402 returns to a size of two segments following the time shift 460. Thus, the merge set 425-4 comprises segments 420-6 and 420-7. The merge set for the first LSM data structure 401 following the time shift 460 did not change and the merge set 415-4 comprises two segments 410-7 and 410-8 for the time period shown in FIG. 4.

FIG. 5 illustrates a phase shift-based resource utilization control process 500 for LSM merge operations in an illustrative embodiment. Generally, the phase shift-based resource utilization control process 500 creates a "phase shift" for merge operations by having one or more LSMs merge fewer than the expected number of segments. For example, if a given system has a default merge set size of eight segments, the number of segments for a given LSM data structure may be reduced to seven segments, causing the next merge operation to be shifted in time by one segment.

In one or more embodiments, the phase-shifted merging of metadata updates for LSM data structures is performed in response to an occurrence of one or more triggers, such as a maximum size of the LSM is changed (e.g., by adding a segment, removing a segment, adding a level or removing a level); the number of LSMs in the system is changed; and/or one or more LSMs are flushed. If the size of a merge set is up to N segments, there are N different time slots to perform the merging of metadata updates. If there are M LSMs in the system, there are merge operations for M/N LSMs per time slot.

In the example of FIG. 5, a coordinator assigns an LSM index to each LSM in the system. The number of LSMs (e.g., M) is referred to as the LSM count. The number of segments (e.g., N) in a merge set is equal to the designated number of segments to include in the merge set without time shifting.

In some embodiments, each LSM can assign itself to a phase, determined as follows:

Phase Assigned per LSM=Round_Down(LSM Index/LSM Count*Segments in Merge Set).

Thus, for an LSM to assign itself to phase 0, no shift is required. For an LSM to assign itself to phase 1, the LSM performs one merge operation with one less segment than the default number of segments per merge set, one time. For an LSM to assign itself to phase 2, the LSM performs a merge operation with one less segment than the default number of segments per merge set, two times. The phase assignments continue in a similar manner for each provisioned phase. In other embodiments, each LSM can be assigned a phase by a phase coordinator that interacts with multiple LSMs.

The phase assignment formula, in at least some embodiments, leads to a minimal amount of shifting when merge sets increase or decrease in size and more shifting when the number of LSMs in the system changes.

In response to detecting a merge time shift event, the phase shift-based resource utilization control process 500 determines a phase shift (referred to as "new phase") for merge operations for one or more LSMs based on the number of segments to include in the merge set. Each LSM then shifts by an amount equal to the difference between the new phase and the prior phase.

In the event that the assigned phase is a negative number, a given LSM can shift by reducing the number of segments in a merge set by one segment for the following number of merge sets:

Shift=Segments_in_Merge_Set−(New_Phase−Old_Phase).

If the lowest level of a given LSM comprises only one segment per merge set, the level above is used. When shifting a new level of a given LSM, the shifting of the previous level still exists, so even if there are only two phases, there is still some degree of shifting within each phase available.

The assigned phase remains correct if the workload is balanced. Shifting may not last, and not all LSM structures give the same number of inserts. The LSM resource utilization logic 117 can monitor the phase to determine if the phase is distributed according to the assigned shift plan. If there is a drift over time in the fill rate of the LSMs, it may be desirable to perform a realignment of the phase assignments. It is possible to occasionally check for realignment by each LSM reporting a percentage of the merge set size (e.g., a fill rate), relative to the default size, to the LSM resource utilization logic 117. The LSM resource utilization logic 117 can reassign one or more LSMs to a different phase.

The technical solutions described herein provide approaches for implementing an LSM data structure with phase-shifted metadata update merging, which address a number of technical challenges, such as non-uniform resource utilization, by employing a phase-shifted merging of metadata updates for LSM data structures. This advantageously allows a smoother merging of metadata updates.

Among other benefits, the disclosed phase-shifted metadata update merging techniques generate a desynchronized merging of metadata updates associated with multiple LSM data structures by dynamically adjusting merge set sizes. The desynchronized merging of metadata updates provides a more uniform resource (e.g., CPU) utilization profile, without a significant reduction in write amortization because the reduced set size is a relatively rare event. In addition, the phase-shifted metadata update merging is performed dynamically (e.g., based on a current size of LSMs and a number of LSMs)

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Figure 6:
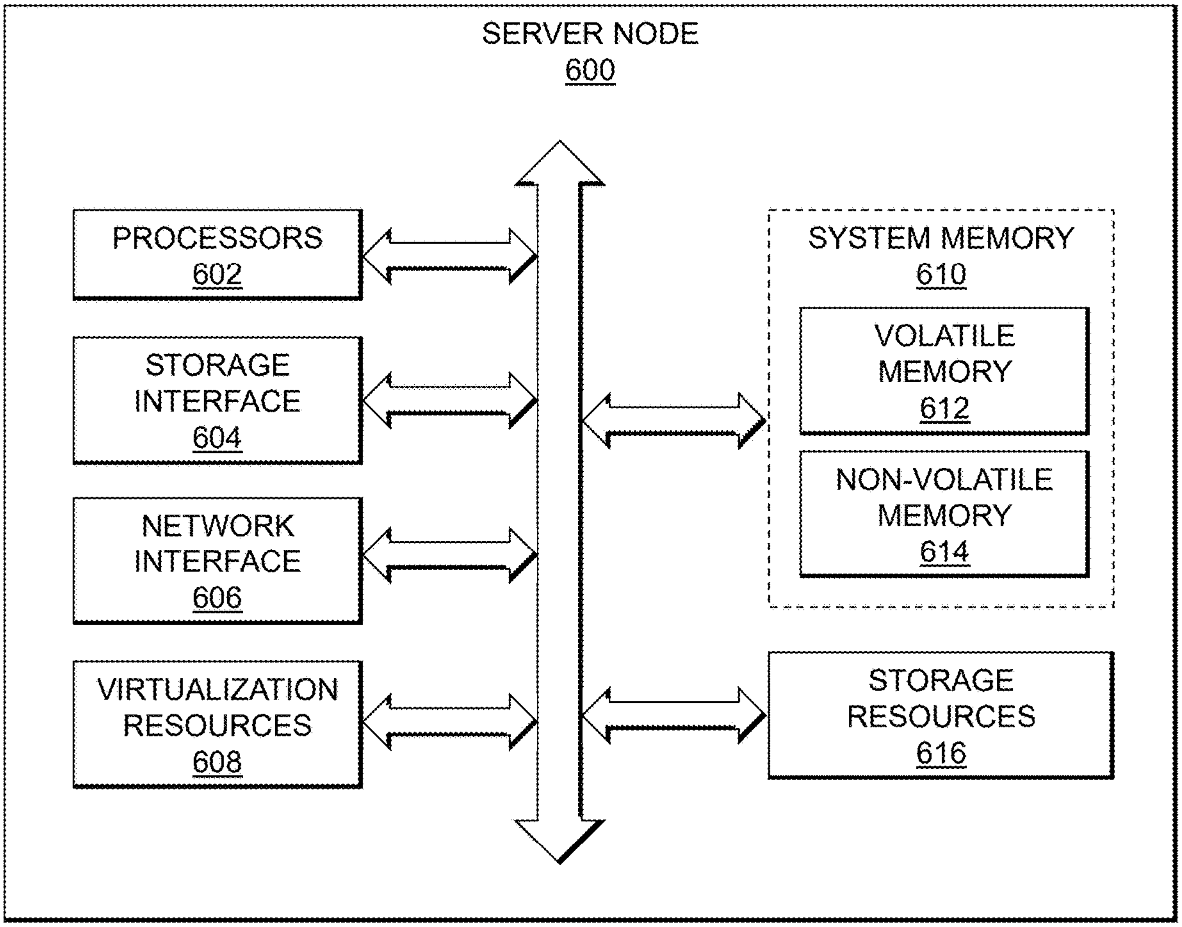
FIG. 6 schematically illustrates a framework of a server node for implementing a storage node which hosts logic for phase-shifted merging of metadata updates for LSM data structures in an illustrative embodiment.

FIG. 6 schematically illustrates a framework of a server node (or more generally, a computing node) for hosting logic for phase-shifted merging of metadata updates for LSM data structures according to an exemplary embodiment of the disclosure. The server node 600 comprises processors 602, storage interface circuitry 604, network interface circuitry 606, virtualization resources 608, system memory 610, and storage resources 616. The system memory 610 comprises volatile memory 612 and non-volatile memory 614. The processors 602 comprise one or more types of hardware processors that are configured to process program instructions and data to execute a native operating system (OS) and applications that run on the server node 600.

For example, the processors 602 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, video processing units (VPUs), neural processing units (NPUs), data processing units (DPUs), and other types of specialized processors or coprocessors that are configured to execute one or more fixed functions.

The storage interface circuitry 604 enables the processors 602 to interface and communicate with the system memory 610, the storage resources 616, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 606 enables the server node 600 to interface and communicate with a network and other system components. The network interface circuitry 606 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 608 can be instantiated to execute one or more services or functions which are hosted by the server node 600. For example, the virtualization resources 608 can be configured to implement the various modules and functionalities as discussed herein. In one embodiment, the virtualization resources 608 comprise virtual machines that are implemented using a hypervisor platform which executes on the server node 600, wherein one or more virtual machines can be instantiated to execute functions of the server node 600. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 600, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In these and other embodiments, compute and/or storage services can be offered to cloud infrastructure tenants or other system users as a Platform-as-a-Service (PaaS) model, an Infrastructure-as-a-Service (IaaS) model, a Storage-as-a-Service (STaaS) model and/or a Function-as-a-Service (FaaS) model, although numerous alternative arrangements are possible.

In another embodiment, the virtualization resources 608 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 600 as well as execute one or more of the various modules and functionalities as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

The various components of, e.g., the LSM resource utilization logic 117, comprise program code that is loaded into the system memory 610 (e.g., volatile memory 612), and executed by the processors 602 to perform respective functions as described herein. In this regard, the system memory 610, the storage resources 616, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 610 comprises various types of memory such as volatile RAM, NVRAM, or other types of memory, in any combination. The volatile memory 612 may be a dynamic random-access memory (DRAM) (e.g., DRAM DIMM (Dual In-line Memory Module), or other forms of volatile RAM. The non-volatile memory 614 may comprise one or more of NAND Flash storage devices, SSD devices, or other types of next generation non-volatile memory (NGNVM) devices. The system memory 610 can be implemented using a hierarchical memory tier structure wherein the volatile memory 612 is configured as the highest-level memory tier, and the non-volatile memory 614 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 602 to execute a native operating system and one or more applications or processes hosted by the server node 600, and to temporarily store data that is utilized and/or generated by the native OS and application programs and processes running on the server node 600. The storage resources 616 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method comprising:

maintaining, in memory of a storage system, at least a portion of a log-structured merge (LSM) data structure comprising metadata entries associated with input-output operations of the storage system, the LSM data structure comprising two or more levels, at least one of the two or more levels comprising a plurality of segments;

determining, responsive to detecting a merge condition, a merge set comprising two or more of the plurality of segments in a first level of the LSM data structure; and merging metadata updates from the determined merge set to a segment of a second level of the LSM data structure, wherein a number of segments included in at least one merge set of the LSM data structure is changed to provide a shift in time of the merging relative to a time of a merging of at least one merge set of at least one additional LSM data structure;

wherein the method is performed by at least one processing device comprising a processor coupled to a memory.

2. The method of claim 1, wherein the number of segments included in the merge set of the LSM data structure is changed in response to an occurrence of one or more of a change in a maximum size of the LSM data structure; a total number of LSM data structures; and a flushing of one or more of the LSM data structures.

3. The method of claim 1, wherein the LSM data structure is assigned an initial phase and the LSM data structure is assigned a new phase associated with the shift in time, and wherein a number of segments included in the merge set, at the time of the shift, is based at least in part on a difference between the new phase and the initial phase.

4. The method of claim 1, further comprising creating a designated number of phases, for a plurality of LSM data structures to merge respective metadata updates, by changing a number of segments included in at least one merge set the designated number of times.

5. The method of claim 1, further comprising creating a shift of the merging in a first time direction by a given number of the segments by shifting in a second time direction by an amount equal to a default number of segments included in a merge set less the given number of the segments.

6. The method of claim 1, further comprising monitoring a synchronization of the merging of metadata updates by a plurality of LSM data structures based at least in part on a fill rate of a current merge set in a lowest level of the plurality of the LSM data structures.

7. The method of claim 1, wherein the plurality of segments comprises time-ordered metadata entries associated with the input-output operations of the storage system.

8. The method of claim 1, further comprising removing at least one of the two or more segments in the merge set from the LSM data structure responsive to completing the merging.

9. The method of claim 1, wherein the merge set comprises less than all of the plurality of segments in the first level of the LSM data structure.

10. The method of claim 1, further comprising maintaining, in the memory of the storage system, a plurality of bloom filters for respective ones of the plurality of segments.

11. The method of claim 10, further comprising removing a given one of the plurality of bloom filters, associated with a given segment, responsive to completing the merging of the given segment to the second level of the LSM data structure.

12. An apparatus comprising:

at least one processing device comprising a processor coupled to a memory;

the at least one processing device being configured to implement the following steps:

maintaining, in memory of a storage system, at least a portion of a log-structured merge (LSM) data structure comprising metadata entries associated with input-output operations of the storage system, the LSM data structure comprising two or more levels, at least one of the two or more levels comprising a plurality of segments;

determining, responsive to detecting a merge condition, a merge set comprising two or more of the plurality of segments in a first level of the LSM data structure; and merging metadata updates from the determined merge set to a segment of a second level of the LSM data structure, wherein a number of segments included in at least one merge set of the LSM data structure is changed to provide a shift in time of the merging relative to a time of a merging of at least one merge set of at least one additional LSM data structure.

13. The apparatus of claim 12, wherein the number of segments included in the merge set of the LSM data structure is changed in response to an occurrence of one or more of a change in a maximum size of the LSM data structure; a total number of LSM data structures; and a flushing of one or more of the LSM data structures.

14. The apparatus of claim 12, wherein the LSM data structure is assigned an initial phase and the LSM data structure is assigned a new phase associated with the shift in time, and wherein a number of segments included in the merge set, at the time of the shift, is based at least in part on a difference between the new phase and the initial phase.

15. The apparatus of claim 12, further comprising monitoring a synchronization of the merging of metadata updates by a plurality of LSM data structures based at least in part on a fill rate of a current merge set in a lowest level of the plurality of the LSM data structures.

16. The apparatus of claim 12, further comprising maintaining, in the memory of the storage system, a plurality of bloom filters for respective ones of the plurality of segments and removing a given one of the plurality of bloom filters, associated with a given segment, responsive to completing the merging of the given segment to the second level of the LSM data structure.

17. A computer program product comprising a non-transitory processor-readable storage medium having stored therein program code of one or more software programs, wherein the program code when executed by at least one processing device causes the at least one processing device to perform the following steps:

maintaining, in memory of a storage system, at least a portion of a log-structured merge (LSM) data structure comprising metadata entries associated with input-output operations of the storage system, the LSM data structure comprising two or more levels, at least one of the two or more levels comprising a plurality of segments;

determining, responsive to detecting a merge condition, a merge set comprising two or more of the plurality of segments in a first level of the LSM data structure; and merging metadata updates from the determined merge set to a segment of a second level of the LSM data structure, wherein a number of segments included in at least one merge set of the LSM data structure is changed to provide a shift in time of the merging relative to a time of a merging of at least one merge set of at least one additional LSM data structure.

18. The computer program product of claim 17, wherein the number of segments included in the merge set of the LSM data structure is changed in response to an occurrence of one or more of a change in a maximum size of the LSM data structure; a total number of LSM data structures; and a flushing of one or more of the LSM data structures.

19. The computer program product of claim 17, wherein the LSM data structure is assigned an initial phase and the LSM data structure is assigned a new phase associated with the shift in time, and wherein a number of segments included in the merge set, at the time of the shift, is based at least in part on a difference between the new phase and the initial phase.

20. The computer program product of claim 17, further comprising monitoring a synchronization of the merging of metadata updates by a plurality of LSM data structures based at least in part on a fill rate of a current merge set in a lowest level of the plurality of the LSM data structures.

* * * * *